R. GRABOWSKY.
PRODUCTION OF HOLLOW GRATE BARS.
APPLICATION FILED JUNE 29, 1915.

1,177,320.

Patented Mar. 28, 1916.

Inventor:
Robert Grabowsky
by his attorneys
Brieser & Jump

UNITED STATES PATENT OFFICE.

ROBERT GRABOWSKY, OF HANOVER, GERMANY.

PRODUCTION OF HOLLOW GRATE-BARS.

1,177,320.  Specification of Letters Patent.  Patented Mar. 28, 1916.

Application filed June 29, 1915. Serial No. 36,980.

*To all whom it may concern:*

Be it known that I, ROBERT GRABOWSKY, a citizen of the German Empire, residing at Hanover, Germany, have invented certain new and useful Improvements Relating to the Production of Hollow Grate-Bars, of which the following is a specification.

Hollow grate bars and particularly those having two longitudinal chambers or passages therein, have generally been made hitherto by bending up a long strip of metal of which the adjacent edges were subsequently welded together.

It is the object of the present invention to overcome the necessity for this welding together of the edges. According to the present invention a hollow integral piece of pipe is used which is made on the inside with projections for forming the partition wall between the chambers. The grate bar is formed from this pipe without welding by converting the pipe into the shape of a grate bar by rolling or pressing, the internal projections in the pipe being brought together in this way to form the partition wall.

The invention also relates to a particular shaping of the top- or fire-surfaces of the grate bars and of the upper side-faces adjacent to said top-surfaces.

Figure 4:
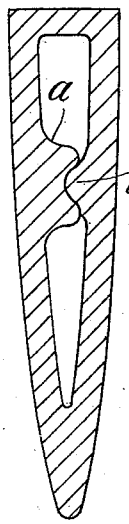
Figure 5:
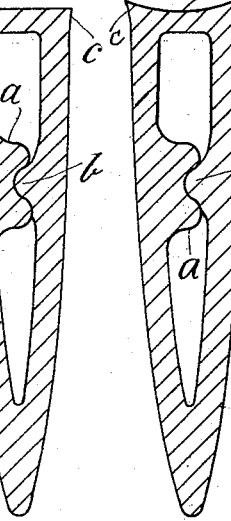
Figure 6:
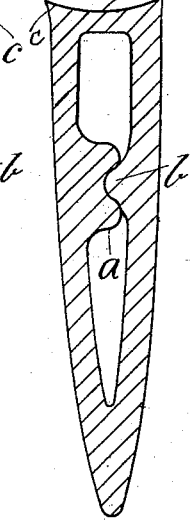

In the accompanying drawing, Figures 1 to 4 show the various stages in the formation of the grate bar. Fig. 5 shows a particular form of the grate bar having sharply chamfered edges at the fire-surface. Fig. 6 shows a similar form of construction wherein the fire-surface is inwardly curved.

Figure 1:
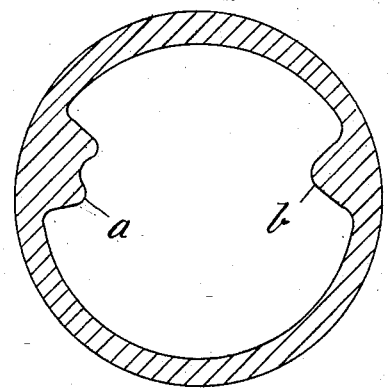
Figure 2:
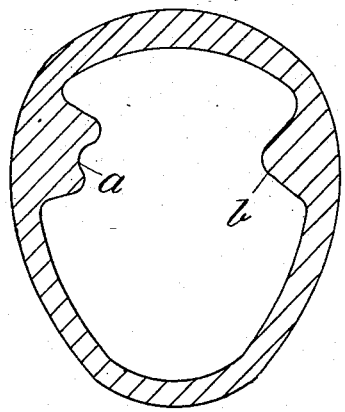
Figure 3:
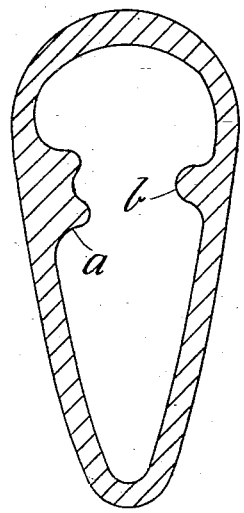

Fig. 1 shows in section a pipe formed on the inside with projections $a$ and $b$ at opposite sides. Such a pipe is gradually shaped by rolling or pressing first into the oval form shown in Fig. 2, then into the more wedge-shaped form shown in Fig. 3, and finally into the form of the hollow grate bar with two chambers or passages therein as shown in Fig. 4. The production of the grate bar is thus effected by changing the original pipe into the form of the grate bar without any welding being necessary. As the original shape consists of a body of closed cross-section, deformation or malformation is less likely to occur in the changing of the shape, such deformation having previously been a source of trouble as it was liable to produce irregularities at the edges which were to be welded together when the grate bar was made by bending up a sheet.

According to the process of manufacture forming the subject of this invention, it will be seen that just at those places where the strengthening of the material is desirable, namely at the points of bending at the top and at the bottom, the metal will become pressed up so that an appreciable thickening of the material will be effected at these points. When internal projections are used of the form shown in the drawing, a very effective joint is formed by the engaging together of the tongue and groove members $b$ and $a$ as will be apparent. This tongue and groove formation extends throughout the whole length of the bar so that there is no risks that lateral deformations of the bar will be produced in the rolling or pressing from the pipe section into the bar section.

It is not essential that the pipe with the internal projections, forming the body with which the operation starts, should be circular externally. It can for example be made at the start more or less oval or approximately wedge-shaped. At certain places also as Figs. 1 and 2 indicate, the walls may be increased in thickness so that at these places where a strengthened cross-section is desired, for example particularly at the fire-surface, the walls of the finished grate bar may be made thicker. The shape or profile of the internal projections $a$ and $b$ may also be varied. Again, it is possible to attain the result by using a projection only at one side in which case it is desirable to have a groove at the other side in order that a tongue and groove connection can be formed in the manner above set forth.

By the new method of manufacture hereinbefore explained, grate bars with two chambers can be made of great length. The new method of manufacture presents in fact the most considerable advantages specially in the case of long grate bars, because the formation of a good and clean welded joint in the case of long bars becomes increasingly difficult.

The transformation of the pipe into the grate bar section may be effected in other ways for example by drawing through dies instead of by rolling or pressing.

If the hollow bars made by the process above described are to be formed into such a way as to facilitate the falling through of the ashes of the burnt material, that is to say if the spaces between the bars are to present a considerable free gap, a chamfered projecting edge c can be formed at each side of the bar constituting an extension toward each side of the fire-surface as seen in Fig. 5. In this way the result is attained that directly beneath the edges of the fire-surfaces the gap between the bars widens rapidly thus rendering easy the falling through of the ashes of combustion, and avoiding risk that they will choke the gap between the bars. The fire-surfaces may also be given a concave or inwardly curved form by the pressing inward of the middle parts i of the tops of the bars more than the edges thereof as seen in Fig. 6. The fire-surfaces of the bars in this way are given the form of shallow longitudinal gutters in which insulating or protecting layers of ashes or incombustible residue can always collect. At the same time such layers provide for the heat-insulation of the fire-surfaces of the bars; the baking or fusing on of the residue of combustion is thus avoided and a saving in water for cooling is effected.

Instead of forming the bars with inwardly curved top surfaces as at i, Fig. 6, they may be formed with any other suitable form of fire-surfaces and for example inclined faces meeting together at the center at an obtuse angle can obviously be formed. Again, the edges which are chamfered inwardly beneath the corners of the fire-surfaces may be creased or corrugated instead of being made with smooth faces.

I claim:

Method of making a hollow grate bar which consists in forming a tubular bar with an inwardly extending longitudinal projection and an opposed grooved seat, and subjecting said bar to transverse compression, whereby said projection is brought into engagement with said seat.

In testimony whereof I affix my signature.

ROBERT GRABOWSKY.